Dec. 26, 1967   J. R. KATCHKA   3,360,198
PRESSURE REGULATOR FOR DIAPHRAGM GAS VALVES
Filed May 27, 1966
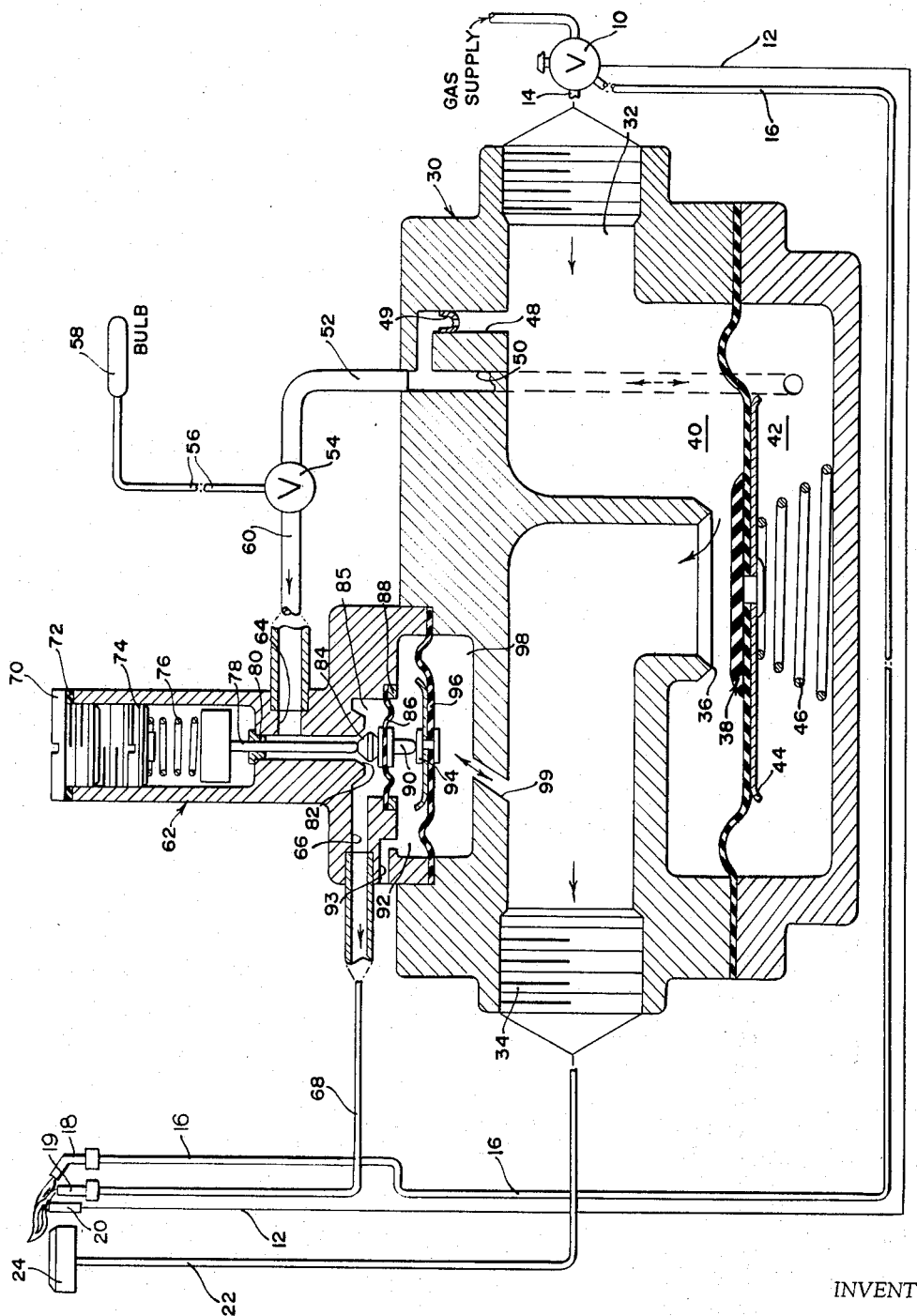
INVENTOR
JAY R. KATCHKA
BY *Anthony A. O'Brien*
ATTORNEY

United States Patent Office 3,360,198
Patented Dec. 26, 1967

3,360,198
PRESSURE REGULATOR FOR DIAPHRAGM GAS VALVES
Jay R. Katchka, Long Beach, Calif., assignor to Robertshaw Controls Company, Richmond, Va., a corporation of Delaware
Filed May 27, 1966, Ser. No. 553,558
10 Claims. (Cl. 236—80)

ABSTRACT OF THE DISCLOSURE

A pressure regulator located within the bleed line of a gas diaphragm valve to effectuate operation of the valve, such regulator including a pair of operatively associated diaphragm elements with different pressure responsive areas. The first, or smaller, diaphragm acts as a buffer for preventing any back pressures in the bleed line from materially influencing the position of the second diaphragm element, which element, in turn, prevents surging or pumping of the main diaphragm valve which modulates the main gas flow.

---

This invention relates generally to a diaphragm gas valve, and more particularly, to a novel pressure regulator situated in the bleed line of a diaphragm valve to effect operation of the valve and thereby control the flow of gas to the main burner of a heating device.

Diaphragm valve controls are widely used which utilize an internal bleed system to regulate the operation of a main diaphragm valve and thereby adjust the fuel flow through the valve to a heating apparatus. Such a bleed system provides a bleed line passage in direct communication extending between the inlet and outlet of the main diaphragm valve and having a branch passage to one side of the diaphragm which controls main gas flow. A small sensing regulator is inserted in the bleed line to regulate the bleed line flow and thus influence operation of the main diaphragm valve. Such controls perform most satisfactorily but their effective capacity in terms of flow is limited to the pressure differential between the inlet and outlet pressure.

In order to increase the flow capacity of the control, while not sacrificing the favorable operational characteristics of a diaphragm valve with a regulator situated in an internal bleed line, resort was made to diaphragm valves utilizing an external bleed line, i.e., a bleed line venting at atmospheric pressure. Such venting at near-atmospheric pressures consequently increased the capacity or range of pressures over which the regulator could function to adjust the main diaphragm valve and hence the main gas pressure. Adjustment of the main gas pressure was accomplished by subjecting one side of the diaphragm situated within the regulator to main gas outlet pressure, while subjecting the other side thereof to the external bleed flow. The bleed flow was exhausted to atmosphere or was fed to the pilot burner for consumption thereat.

Problems were encountered, which severely limited the effectiveness of the regulator when conditions arose that would cause any appreciable restriction in the conduit leading from the pressure regulator to the bleed burner. Restrictions such as excessive tubing, crimped tubing, undersized bleed burner orifices, and carbonization or scale at the bleed burner orifice result in destroying the effective pressure regulation.

Such restrictions cause back pressure to build up and result in a "pumping" action of the main diaphragm valve, so that wide surges in the outlet pressure of the main fuel flow are created with subsequent loss of regulation of the fuel flow.

Accordingly, it is an object of the present invention to eliminate surging in a main gas diaphragm valve operated by an external bleed system.

Another object of the present invention is to provide a pressure regulator with a pair of operatively associated diaphragms situated therein; the first of the pair of diaphragms acting as a buffer to insulate any back pressures in the bleed line from the second of the diaphragms.

Another object of the present invention is to provide a pressure regulator that is susceptible of low cost manufacture and which regulator is efficient and reliable in operation.

In practicing the present invention, a control device for fuel burning apparatus includes a casing with inlet and outlet means and diaphragm valve means operatively disposed therebetween for controlling the main fuel flow, bleed line means which effects operation of the diaphragm valve means, control means in the bleed line means for controlling a bleed flow therethrough, regulator means in the bleed line for regulating the flow therethrough and means acting on the regulator means and buffing its operation to eliminate back pressure influence on the diaphragm valve means.

Other objects and advantages of the present invention will become readily apparent from the ensuing description of a preferred embodiment when taken in connection with the accompanying drawing wherein the single figure is a vertical cross-section of a diaphragm gas control valve constructed in accordance with the present invention and schematically associated with burner apparatus.

The drawing shows a heating control system which includes a manually resettable on-off control device 10 having an inlet conduit connected to a gas supply, a thermocouple connector lead 12, a main flow outlet conduit 14 and a pilot flow outlet conduit 16 which leads to pilot burner 18 which is disposed adjacent a bleed flow burner 19 and a thermocouple 20 in proximity to each other. The main flow outlet conduit 14 supplies a flow of gas via conduit 22 to a main burner 24 located in igniting proximity to the pilot burner 18. Thermocouple 20 is disposed in the flame of pilot burner 18 and is connected to the lead 12 for controlling an electromagnetic safety valve (not shown) located in the control device 10.

The previously enumerated components of the heating control system are so well known in the art that further structural details are omitted for the sake of brevity.

In operation of the system of FIG. 1, the safety valve 10 is manually opened (as by reset button) to establish a pilot flow of gas through conduit 16 to the pilot burner 18, which is then ignited, as by a match; safe lighting is accomplished by preventing flow to the main flow outlet 14, as by using a separate passage in control device 10 or by providing a manual operator with a pilot position. As soon as thermocouple 20 is sufficiently heated, the reset button may be released since the safety valve will be held open by its electromagnet being energized from the thermoelectric current of the thermocouple 20 being heated at the pilot burner 18. If for any reason the pilot burner flame is extinguished, the thermocouple will cool and deenergize the electromagnet, thus causing closure of the safety valve which is adjacent to the inlet of the control device 10 to cut off all flow of gas.

During normal operation of the heating control system, the flow of gas to the main burner 24 is controlled by a valve device, indicated generally by reference numeral 30, operatively disposed between inlet conduit 14 and outlet conduit 22 whereby the main gas flow is subject to pressure regulation and thermostatic on-off control before reaching the burner 24.

The valve device 30 includes a casing having an inlet passage 32 and an outlet passage 34 separated by a valve seat 36. A flexible diaphragm defining a valve member 38 cooperates with the valve seat 36 to control the flow therethrough. The periphery of the diaphragm valve 38 is clamped between sections of the casing, which are secured together as by bolts (not shown). The central part of the diaphragm 38 separates a hollow cavity of the casing into an inlet pressure chamber 40 and an operating pressure chamber 42. The chamber 40 communicates with the inlet passage 32 so that the upper surface of the diaphragm valve is subjected to inlet pressure. A back-up plate 44 is secured to the under surface of the diaphragm 38 and a coil spring 46 is mounted in compression between the bottom casing wall of chamber 42 and the back-up plate 44 whereby the diaphragm valve 38 is biased toward engagement with valve seat 36.

The control device 30 is provided with an external bleed line system including an inlet bleed passage 48 which communicates with the main flow inlet passage 32. A flow restrictor 49 is located within the inlet bleed passage 48 to reduce bleed line pressure. Bleed passage 48 communicates with a pair of bleed passageways; one such passageway 50 leads to the operating pressure chamber 42. The other passageway 52 leads to a thermostatically operated valve 54. An operator (not shown) in the valve 54 is connected to one end of capillary tube 56, the other end of which is provided with a thermal sensing bulb 58 that is suitably located in the space being heated by the main burner 24. In accordance with a desired temperature setting, the operator thermostatically cycles the valve 54 between on and off positions in response to temperature variations sensed by the thermal bulb 58.

Downstream of the valve 54, the bleed line passage 60 communicates with a small pressure regulator, indicated generally at 62, having an inlet port 64 and an outlet port 66 that communicates with a conduit 68 leading to the bleed burner 19. The regulator 62 has a hollow cylindrical top portion which is closed and sealed by a threaded bolt 70 and an O-ring seal 72, respectively. The interior of such top portion is threaded to receive the bolt 70 therebelow. A coil spring 76 is mounted in compression between the bottom of the screw 74 and the enlarged top of a plunger 78 which extends through a collar 80 into the flow passage of the pressure regulator 62. The lower end of plunger 78 extends through an annular valve seat 82 and engages a valve member 84 having a generally conical surface for cooperation with the valve seat 82.

The valve member 84 is carried by a flexible diaphragm 86, made of material having good sealing and resilient characteristics and retained in place by having its periphery clamped by an annular ring 88 which is press fitted into a corresponding wall recess. The upper surface of diaphragm 86 defines a movable wall of a chamber 85 which communicates with bleed flow burner 19 through port 66 and conduit 68. The opposite side of sealing diaphragm 86 carries a spacer stud 90 extending into a chamber 92 that is vented at 93 to the atmosphere. The free end of stud 90 abuts a rivet stud 94 centrally carried by a flexible diaphragm 96 which is made of material similar to diaphragm 86, but is generally larger than diaphragm 86. Accordingly, for the sake of differentiating diaphragms 86 and 96, the former is termed "minor" and the latter is termed "major." The major diaphragm 96 defines the flexible top wall of a chamber 98 which includes a port 99 communicating with the main outlet passage 34.

During operation of the above described system, the bleed line controls the operation of the main diaphragm valve 38 which in turn controls the flow of gas to the main burner 24. When the heating requirements in the space being heated are satisfied, the thermostatically operated valve 54 is closed and the bleed line passageway 60 is cut off. A bleed flow of gas has a static path traced from the inlet passage 32 through the inlet bleed passage 48, restrictor 49 and bleed passage 50 to the operating pressure chamber 42; thus, both sides of the diaphragm valve 38 are subject to inlet pressure and the biasing force of the coil spring 46 biases the diaphragm valve 38 against the valve seat 36 so there is no gas flow to the main burner 24.

When there is a demand for heat as sensed by the thermal bulb 58, the theremostatically operated valve 54 and the bleed line passageway 52 are opened. The bleed flow of gas now has a dynamic path traced from the inlet passage 32 through the bleed passageway 52, the opened valve 54, the bleed passageway 60, the pressure regulator 62 and the conduit 68 leading to bleed burner 19 which consumes the bleed flow. Upon opening of the bleed line, the gas in the pressure operating chamber 42 and in the bleed passageway 50 is bled therefrom to the bleed passageway 52, whereupon the pressure in the pressure operating chamber 42 is reduced and the inlet pressure in chamber 40 moves the diaphragm valve member 38 against the bias of coil spring 46 to an open position, whereby the main flow of gas is permitted to flow to the main burner 24 where it is ignited by the flame of the pilot burner 18. Because of the restricting orifice 49, the gas in the pressure operating chamber 42 will be bled faster than the incoming bleed flow through the restrictor 49.

Conversely, a decrease in outlet pressure causes the pressure regulator 62 to decrease the pressure in the operating chamber 42 so that the diaphragm valve 38 is moved away from its seat 36 and thus increase the main gas flow.

If the pressure in the outlet passage 34 increases beyond a predetermined value (as set by the adjusting screw 74), then major diaphragm 96 is flexed upwardly against spring 76 to decrease the flow of bleed gas past valve seat 82. Upward movement of diaphragm 96 and its rivet stud 94 causes upward movement of spacer 90 and the minor diaphragm 86 whereby valve 84 is moved toward seat 82. Consequently, pressure builds up in conduits 60 and 52 and the pressure in operating chamber 42 is increased so that the diaphragm valve 38 is moved toward its seat 36 and thus reduces main gas flow.

During normal regulating operation of the pressure regulator, the spacer 90 maintains the center of the two diaphragms 86 and 96 in spaced relation. Any restrictions in bleed conduit 68, e.g., caused by carbonization or scale as a by-product of combustion at the bleed burner 19, causes a back pressure in the regulator outlet 66 and chamber 85; such back pressure causes downward flexure of the minor diaphragm 86 but does not materially move the major diaphragm because the smaller area of diaphragm 86 as compared to the larger area of the diaphragm 96 minimizes any movement of the major diaphragm 96. Accordingly, the minor diaphragm 86 is slightly flexed toward the atmopsheric chamber 92 whereby pressure variations in the conduit 68 are absorbed without materially changing the flow position of valve 84. While such slight flexure of the buffer diaphragm 86 may result in a momentary increase of pressure in the atmospheric chamber 92, it is quickly exhausted through the vent 93 to the atmosphere. With such an arrangement, any back pressure in conduit 68 will be minimized upstream of the pressure regulator valve 84 and will not unduly influence the position of the main diaphragm valve 38. Accordingly, the buffer means for the pressure regulator diaphragm 96 eliminates unfavorable actions at the main diaphragm valve 38, such as surging, pumping, chattering, etc.

Inasmuch as the present invention is subject to many variations, modifications and changes in details, it is intended that all matter contained in the foregoing description or shown on the accompanying drawing, shall be interpreted as illustrative and not in a limiting sense.

What is claimed is:

1. In a control system for supplying a fuel flow to burner apparatus, the combination comprising a casing having inlet and outlet means for passing fuel flow therethrough, pressure operated diaphragm valve means operatively disposed between said inlet and said outlet means in said casing to control the fuel flow, bleed line means for effecting operation of said diaphragm valve means, control means movably disposed in said bleed line means for controlling a bleed flow therethrough, pressure regulator means in said bleed line means for varying the bleed flow therethrough, and means acting on said pressure regulator means and buffing its operation to eliminate surging of said diaphragm valve means.

2. The combination as recited in claim 1 wherein said means acting on said pressure regulator means comprises actuator means absorbing back pressure variations in the bleed flow.

3. The combination as recited in claim 2 wherein said actuator means includes a differential pressure operated sealing diaphragm, one side of said sealing diaphragm defining a movable wall of a chamber communicating with said outlet means and the other side defining a movable wall of a chamber communicating with the atmosphere.

4. The combination as recited in claim 3 wherein said pressure regulator means comprises a diaphragm element, one side of said diaphragm element defining a movable wall of a chamber communicating with the fuel flow in said outlet means and having valve means to regulate the bleed flow in response to such fuel flow, and the other side of diaphragm element defining a movable wall of a chamber communicating with the atmosphere.

5. The combination as recited in claim 4 wherein said diaphragm element has a rivet stud secured thereto, and said sealing diaphragm carries spacer means extending into the chamber communicating with the atmosphere, said spacer means abutting against said stud.

6. The combination as recited in claim 4 wherein said valve means comprises a valve member with a conical surface and a valve seat, and said pressure regulator further comprises spring means for normally biasing said valve member away from said seat to permit bleed flow.

7. The combination as recited in claim 1 wherein the burner apparatus includes a pilot burner and a pilot fuel supply therefor, and wherein a bleed burner communicates with said bleed line means to consume the bleed flow from said pressure regulator means.

8. The combination as recited in claim 7 wherein said control means in said bleed line is disposed upstream of said pressure regulator means to provide direct on-off control of the bleed line independent of pressure regulation thereof.

9. The combination as recited in claim 5 wherein said sealing diaphragm and said diaphragm element have different pressure responsive surface areas.

10. The combination as recited in claim 5 wherein said sealing diaphragm has a smaller pressure responsive surface area than said diaphragm element.

References Cited
UNITED STATES PATENTS

| | | | |
|---|---|---|---|
| 2,244,555 | 6/1941 | Harris | 236—80 |
| 2,328,279 | 8/1943 | Jones | 236—80 |
| 2,333,775 | 11/1943 | Gille | 236—80 X |
| 2,646,932 | 7/1953 | Frost | 236—80 |
| 3,235,180 | 2/1966 | Graham | 236—80 |

WILLIAM J. WYE, *Primary Examiner.*